(12) United States Patent
Veeraraghavan et al.

(10) Patent No.: US 12,073,267 B2
(45) Date of Patent: Aug. 27, 2024

(54) ZERO CODE METADATA-DRIVEN DYNAMIC API

(71) Applicant: ADP, Inc., Roseland, NJ (US)

(72) Inventors: Vijayanand Veeraraghavan, Chennai (IN); Mogana Rangan Dhathreeswaran, Chennai (IN)

(73) Assignee: ADP, Inc., Roseland, NJ (US)

( * ) Notice: Subject to any disclaimer, the term of this patent is extended or adjusted under 35 U.S.C. 154(b) by 56 days.

(21) Appl. No.: 17/654,496

(22) Filed: Mar. 11, 2022

(65) Prior Publication Data

US 2023/0289246 A1  Sep. 14, 2023

(51) Int. Cl.
*G06F 9/54* (2006.01)
*G06F 16/21* (2019.01)
*G06F 16/25* (2019.01)

(52) U.S. Cl.
CPC ............ *G06F 9/547* (2013.01); *G06F 16/211* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 2003/0217069 A1* | 11/2003 | Fagin | G06F 16/258 |
| | | | 707/999.102 |
| 2004/0162741 A1* | 8/2004 | Flaxer | G06Q 10/10 |
| | | | 705/7.26 |
| 2007/0130208 A1* | 6/2007 | Bornhoevd | G06F 9/5044 |
| 2019/0196890 A1* | 6/2019 | Bucchi | G06F 16/951 |
| 2021/0034669 A1 | 2/2021 | McLaughlin et al. | |
| 2021/0073006 A1* | 3/2021 | Peterkofsky | G06F 9/485 |
| 2021/0224145 A1* | 7/2021 | Warmack | G06F 9/44505 |
| 2022/0222265 A1* | 7/2022 | Kabra | G06N 5/02 |

* cited by examiner

*Primary Examiner* — Umut Onat
(74) *Attorney, Agent, or Firm* — Foley & Lardner LLP (57) ABSTRACT

A method, apparatus, system, and computer program code for accessing data using a dynamic API. A computer system receives, from a requesting service, a request to access data contained in one or more data sets organized into a set of domains. The request is received according to a target schema of the requesting service. The computer system identifies an endpoint configuration for a domain that provides access to the data that was requested. The endpoint configuration is generated from an API description describing the target schema that is published by the domain. The computer system decorates the endpoint configuration with additional information identified from metadata documents corresponding to the data set. The A computer system translates the request into a common schema, and retrieving the data from the domain according to the common schema.

21 Claims, 5 Drawing Sheets

ZERO CODE METADATA-DRIVEN DYNAMIC API

BACKGROUND

1. Field

The disclosure relates generally to an improved computer system and, more specifically, to a method, apparatus, computer system, and computer program product for accessing data using a dynamic API controller.

2. Description of the Related Art

Distributed computer applications are typically embodied as a multiplicity of computers providing well-defined application program interfaces (APIs) to networked users. Each available API configuration is called an "endpoint," and each instance of an endpoint on the network is called an "endpoint instance." Conventionally, endpoints are implemented with imperative programming languages that express how to perform a task, which can be inflexible. Also, endpoints are typically accessed via an API interface to an application server, which in turn communicates with a database server, which can be slow.

SUMMARY

According to one embodiment of the present invention, a method is provided for accessing data using a dynamic API. A request is received from a requesting service to access data contained in one or more data sets organized into a set of domains. The request is received according to a target schema of the requesting service. An endpoint configuration is identified for a domain that provides access to the data that was requested. The endpoint configuration is generated from an API description describing the target schema that is published by the domain. The endpoint configuration is decorated with additional information identified from metadata documents corresponding to the data set. The request is translated into a common schema. The data is retrieved from the domain according to the common schema.

According to another embodiment of the present invention, a computer system comprises a hardware processor, and a dynamic API controller in the computer system for accessing data. The dynamic API controller executes program code to perform a method of: receiving, from a requesting service, a request to access data contained in one or more data sets organized into a set of domains, wherein the request is received according to a target schema of the requesting service; identifying an endpoint configuration for a domain that provides access to the data that was requested, wherein the endpoint configuration is generated from an API description describing the target schema that is published by the domain; decorating the endpoint configuration with additional information identified from metadata documents corresponding to the data set; translating the request into a common schema; and retrieving the data from the domain according to the common schema.

According to yet another embodiment of the present invention, a computer program product comprises a computer-readable storage media with program code stored on the computer-readable storage media for accessing data using a dynamic API. When executed, the program code instructs a computer system to perform a method of: receiving, from a requesting service, a request to access data contained in one or more data sets organized into a set of domains, wherein the request is received according to a target schema of the requesting service; identifying an endpoint configuration for a domain that provides access to the data that was requested, wherein the endpoint configuration is generated from an API description describing the target schema that is published by the domain; decorating the endpoint configuration with additional information identified from metadata documents corresponding to the data set; translating the request into a common schema; and retrieving the data from the domain according to the common schema.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
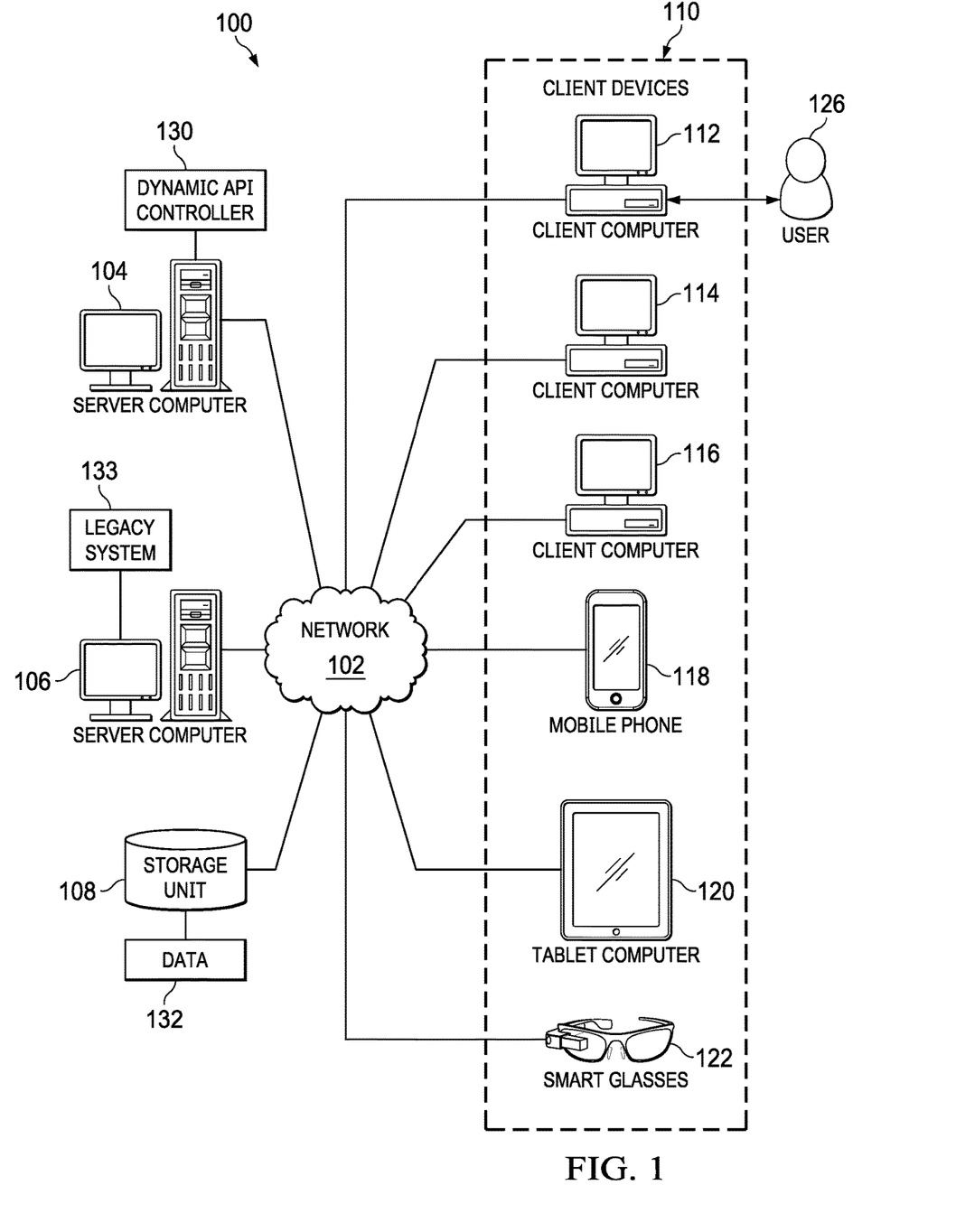
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, dynamic API controller 130 can run on server computer 104. In another illustrative example, dynamic API controller 130 can be run in a remote location such as on client computer 114 and can take the form of a system instance of the application. In yet other illustrative examples, dynamic API controller 130 can be distributed in multiple locations within network data processing system 100. For example, dynamic API controller 130 can run on client computer 112 and on client computer 114 or on client computer 112 and server computer 104 depending on the particular implementation.

Legacy system 133 is highly customizable and completely metadata-driven. Therefore, developers face a steep learning curve to understand the data model and to write code to perform data transformation. Often, legacy systems, such as legacy system 133, do not utilize an API first approach to expose data through an application programming interface. To further complicate data access, legacy system 133 may utilize different schemas and data entities for different domains.

While a few known tools such as SoapUI, Postman, and Swagger can generate API information, all of these packages require a strongly typed object model and cannot work on highly dynamic, metadata-driven systems. For example, Swagger based tools works only with entities or models. Mapping tools like Dapper or Hibernate do not work on a dynamically changing data model.

Dynamic API controller 130 can operate to provide access to data 132 in a legacy system 133 that is metadata-driven. Dynamic API controller 130 solves the underlying data model complexity of legacy system 133 in a manner that eliminates the need to individually configure each and every aspect of the metadata, domain, and context in order to access data 132. Dynamic API controller 130 it is completely metadata and mapping driven allowing a user 126 to define metadata at a common level, and have it overridden at a domain level. Dynamic API controller 130 provides flexibility when mapping data to different target schemas without requiring developers writing schema specific code to query and transform the data.

By only configuring the required endpoint metadata, query metadata and mapping metadata, dynamic API controller 130 enables domain specific access to data 132, as well as transformation into a target schema. Therefore, dynamic API controller 130 eliminates the need to develop and deploy API to expose data for every domain and systems that previously required developers to write code for each and every domain specific API. Dynamic API controller 130 therefore reduces API development and redeployment each time that a requesting service or client user requires an additional piece of information from the system of record.

Dynamic API controller 130 works on a common enterprise data model defined and exchanged between system of record and requesting services. Dynamic API controller 130 automatically understands the OpenAPI document published by individual domains, as well as generated endpoint configuration metadata without needing to generate code for a specific data model. This endpoint metadata is then decorated with additional metadata information about the query or entity and mapping information between system of record entity model and enterprise standard domain model.

Dynamic API controller 130 is designed to understand incoming API requests using several headers with respect to different data dimensions, schemas, and content type requested as well as the system of record. By reducing the plurality of the metadata by matching the request headers, dynamic API controller 130 smartly identifies a domain related to the incoming request, and relevant endpoint metadata. Using an entity mapping document, dynamic API controller 130 identifies queries required to run on the system of record for the specific endpoint and retrieve all the requested data entities by. Using mapping metadata defined between the System of record entities and the target schema, a mapping service transforms these data entities to a target schema or object model of the requesting service.

Therefore, dynamic API controller 130 beneficially enables the exchange data between a system of record and any requesting service defined in a schema model. Additionally, dynamic API controller 130 can also work with non-relational database systems by retrieving data 132 through an API instead of queries, while making use of the other underlying facets of the invention such as endpoint configuration metadata and mapping metadata.

Figure 2:
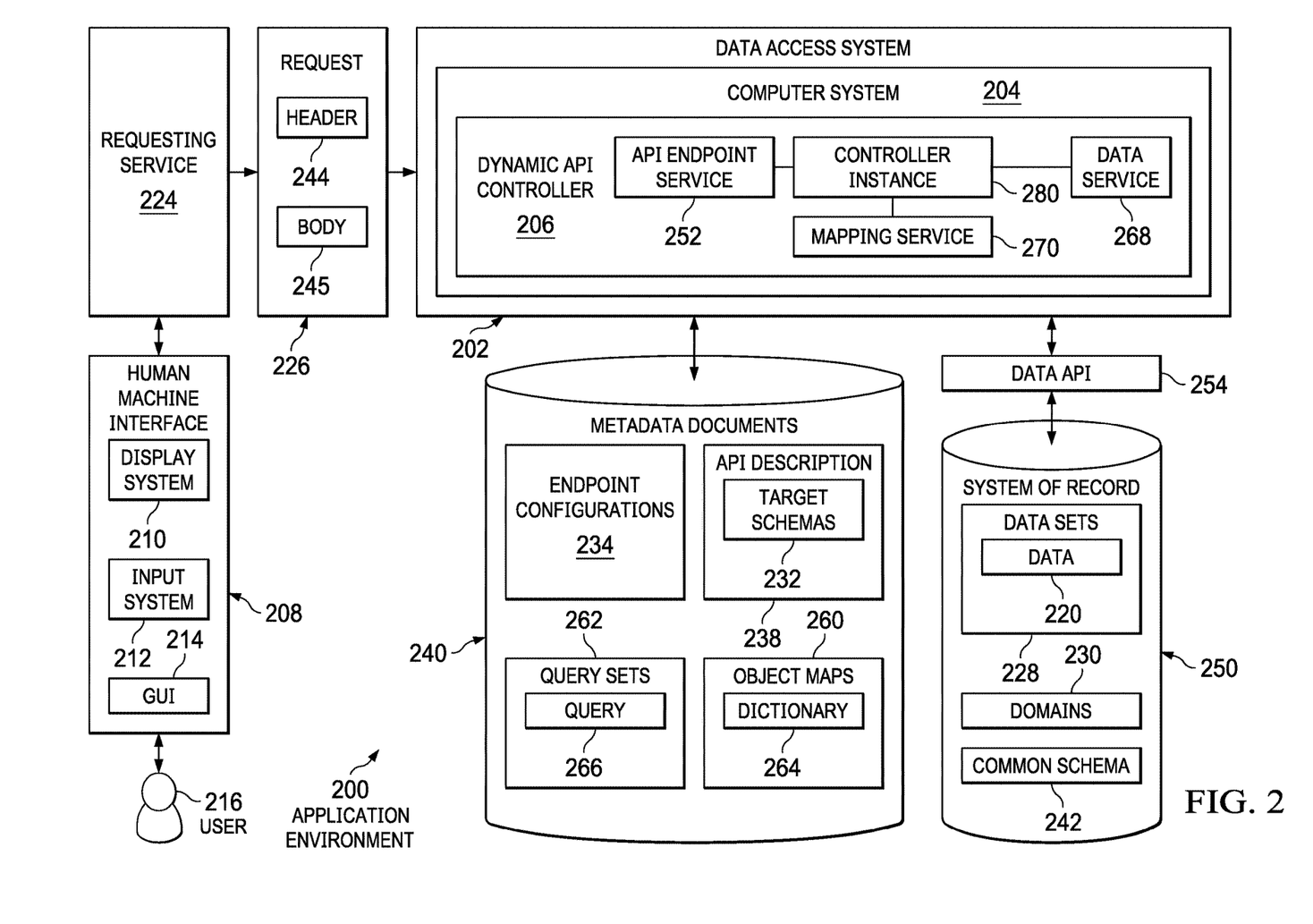
FIG. 2 is a block diagram of a data access environment in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1. In this illustrative example, data access system 202 in application environment 200 can provide domain-specific access to data 220 by using dynamic API controller 206.

As depicted, data access system 202 comprises computer system 204 and dynamic API controller 206. Dynamic API controller 206 runs in computer system 204. Dynamic API controller 206 can be implemented in software, hardware, firmware, or a combination thereof. When software is used, the operations performed by dynamic API controller 206 can be implemented in program code configured to run on hardware, such as a processor unit. When firmware is used, the operations performed by dynamic API controller 206 can be implemented in program code and data and stored in persistent memory to run on a processor unit. When hardware is employed, the hardware may include circuits that operate to perform the operations in dynamic API controller 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, human machine interface 208 can enable user 216 to interact with one or more computers or other types of computing devices in computer system 204. For example, these computing devices can be client devices such as client devices 110 in FIG. 1.

In this illustrative example, dynamic API controller 206 in computer system 204 is configured to provide access to data 220 contained in one or more data sets 228, and organized into a set of domains 230. Dynamic API controller 206 receives a request 226 to access data 220 from a requesting service 224. Request 226 is received according to a target schema 232 of the requesting service 224.

Request 226 can be an API call representing one or more specific operations to perform with respect to data 220. For example, request 226 may be a RESTful request, such as a GET, PUT, POST, or DELETE, conforming to the representational state transfer architectural style.

As depicted, request 226 includes header 244 and body 245. Header 244 can include information about requesting service 224, target schema 232, data sets 228, data 220 that is requested, and the system of record 250.

In this illustrative example, dynamic API controller 206 identifies an endpoint configuration 234. Endpoint configuration 234 is one of metadata documents 240 that includes information for a domain 230. Domain 230 provides access to the data 220 that was requested.

In one illustrative example, dynamic API controller 206 identifies endpoint configuration 234 from information in header 244. Dynamic API controller 206 identifies a header 244 in the request, and matches the header to the endpoint configuration. For example, API endpoint service 252 may cache information from header 244 as an array, and subsequently apply a reduce function to match the header 244 with endpoint configuration 234.

In this illustrative example, endpoint configuration 234 is generated from an API description 238. API description 238 is one of metadata documents 240, published by the domain 230, and describing the target schema 232. For example, API description 238, sometimes also referred to as a Swagger document, can be a document (or set of documents) that defines or describes data API 254, according to the OpenAPI Specification.

The Swagger document specifies the list of resources that are available in the REST API and the operations that can be called on those resources. The Swagger document also specifies the list of parameters to an operation, including the name and type of the parameters, whether the parameters are required or optional, and information about acceptable values for those parameters. Additionally, the Swagger document can include JSON Schema that describes the structure of the request body that is sent to an operation in a REST API, and the JSON schema describes the structure of any response bodies that are returned from an operation.

In response to identifying endpoint configuration 234, dynamic API controller 206 decorates the endpoint configuration 234 with additional information identified from metadata documents 240 corresponding to the endpoint identified for the requested domain. For example, dynamic API controller 206 may identify at least one of object map 260 and one of query sets 262. Dynamic API controller 206 may then generate a SQL request to data API 254 based on the endpoint configuration, the object map, and the query set.

Dynamic API controller 206 identifies an object map 260 for the domain 230. The object map 260 is one of metadata documents 240 that correlates data 220 between the target schema 232 and the common schema 242. In one illustrative example, object map 260 can be a dictionary 264, also sometimes referred to as a map, hash map or associative array, of key/value pairs where the keys are strings, as defined by the OpenAPI specification. Mapping service 270 uses object map 260 to correlate data 220 between the target schema 232 and the common schema 242.

Dynamic API controller 206 identifies one of query sets 262 for the domain 230. Each of query sets 262 is one of metadata documents 240 that contains a list of queries 266, and optionally parameters therefore, that can be executed within a corresponding one of domain 230.

Using data service 268, dynamic API controller 206 translates the request into a common schema 242, and retrieving the data 220 from the domain 230 according to the common schema 242. In one illustrative example, dynamic API controller 206 generate a SQL request based on the endpoint configuration 234, the object map 260, and the query set. Dynamic API controller 206 forwards the SQL request to a data API 254, and retrieves the data 220 through the data API according to the SQL request.

In one illustrative example, in response to retrieving the data, dynamic API controller 206 translates the data from the common schema 242 to the target schema 232. Dynamic API controller 206 then sends a response to the requesting service 224. The response includes the data that was translated into the target schema 232.

In one illustrative example, dynamic API controller 206 generates separate controller objects for each of domains 230. These controller objects can be instances of a template object, generated according to API description 238. For example, in generating a controller instance 280 for the domain 230, dynamic API controller 206 identifies the API description 238 published by the domain 230 and describing the target schema. Dynamic API controller 206 then generates controller instance 280 from a template object and the API description 238. As explained above, the API description 238 can be an OpenAPI document that specifies the data sets 228 that are available in the domain 230 and RESTful operations that can be called on the data sets 228.

In one illustrative example, one or more solutions are present that overcome a problem with generating domain specific APIs. As a result, one or more illustrative examples may provide access to data in a manner that solves the underlying data model complexities of legacy systems. Dynamic API controller 206 is metadata and mapping driven, eliminating the necessity to individually configure domain specific APIs by allowing a user to define metadata at a common level, and have it overridden at a domain level. Dynamic API controller 206 therefore provides flexibility when mapping data to different target schemas without requiring developers writing schema specific code to query and transform the data.

Computer system 204 can be configured to perform at least one of the steps, operations, or actions described in the different illustrative examples using software, hardware, firmware, or a combination thereof. As a result, computer system 204 operates as a special purpose computer system in dynamic API controller 206 in computer system 204. In particular, dynamic API controller 206 transforms computer system 204 into a special purpose computer system as compared to currently available general computer systems that do not have dynamic API controller 206. **talk more about improved performance here and how the processes allow you to have a computer system that can more easily map data to different target schemas as compared to current systems that do not have these features. —emphasize that here and at the end The illustration of data access environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
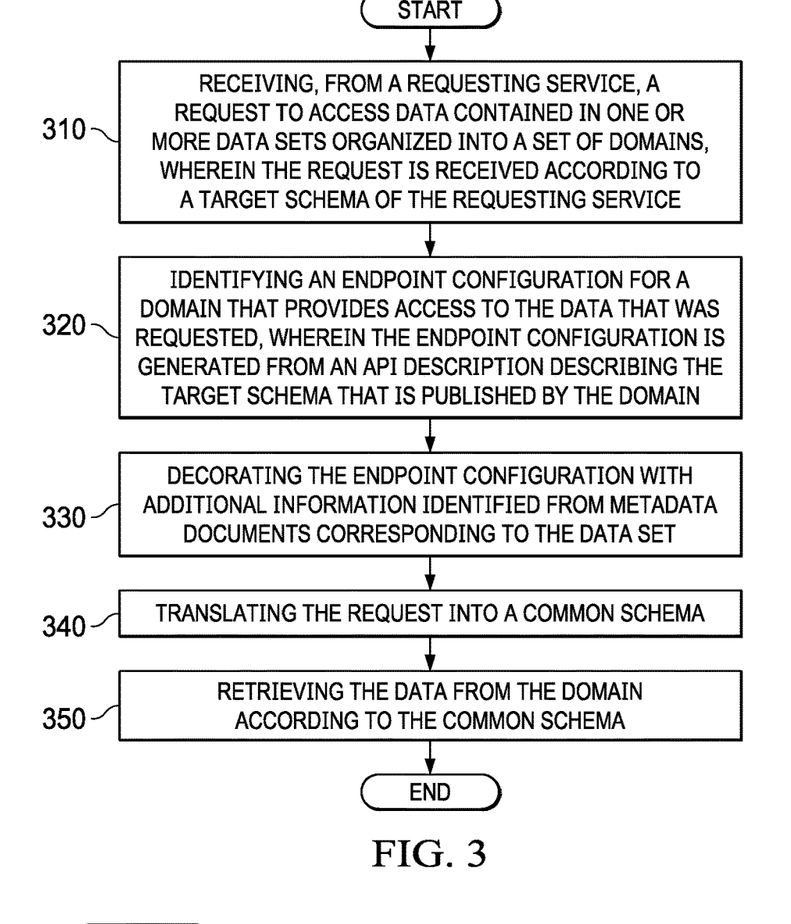
FIG. 3 is a flowchart of a process for accessing data using a dynamic API in accordance with an illustrative embodiment.

Turning next to FIG. 3, a flowchart of a process for accessing data using a dynamic API controller is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in dynamic API controller 206 in computer system 204 of FIG. 2.

The process begins by receiving, from a requesting service, a request to access data contained in one or more data sets organized into a set of domains (step 310). The request is received according to a target schema of the requesting service.

The process identifies an endpoint configuration for a domain that provides access to the data that was requested (step 320). The endpoint configuration is generated from an API description describing the target schema that is published by the domain.

The process decorates the endpoint configuration with additional information identified from metadata documents corresponding to the data set (step 330), and translates the request into a common schema (step 340). The process retrieves the data from the domain according to the common schema (step 350). Thereafter, the process terminates.

Figure 4:
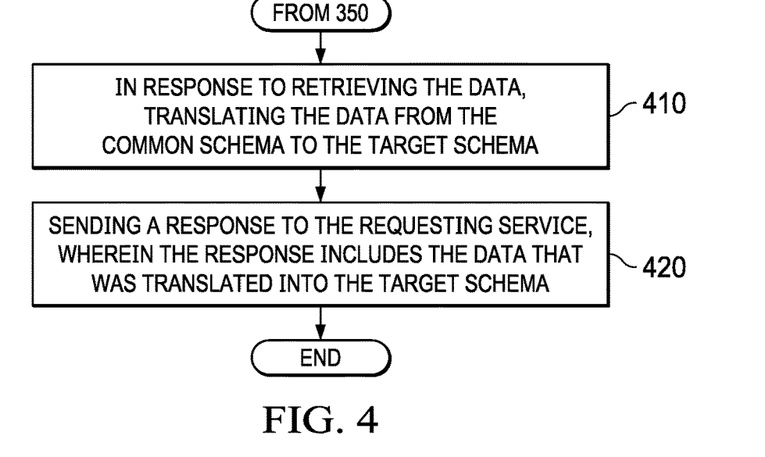
FIG. 4 is a flowchart of additional steps process for accessing data using a dynamic API controller depicted in accordance with an illustrative embodiment.

With reference next to FIG. 4, a flowchart of additional steps process for accessing data using a dynamic API controller is depicted in accordance with an illustrative embodiment. The process in FIG. 4 is an example one implementation for and additional processing steps that can be performed in conjunction with the process of FIG. 3.

Continuing from step 350, in response to retrieving the data, the process translates the data from the common schema to the target schema (step 410). The process then sends a response to the requesting service that includes the data that was translated into the target schema (step 420). Thereafter, the process terminates.

Figure 5:
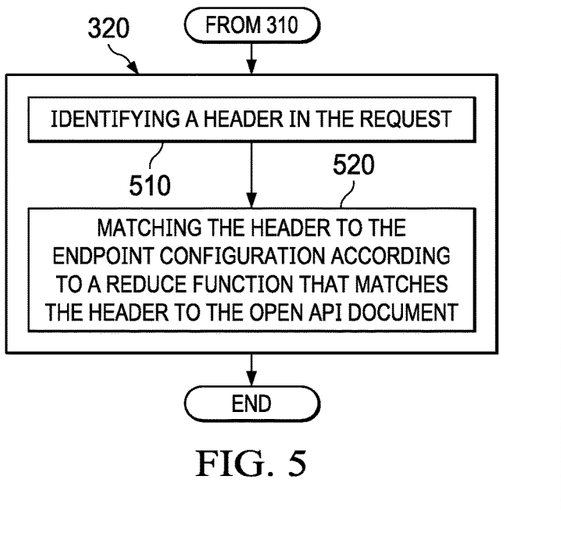
FIG. 5 is a flowchart of a process for identifying an endpoint configuration depicted in accordance with an illustrative embodiment.

With reference next to FIG. 5, a flowchart of a process for identifying an endpoint configuration is depicted in accordance with an illustrative embodiment. The process in FIG. 5 is an example one implementation for step 320 in FIG. 3.

Continuing from step 310, the process identifies a header in the request (step 510). The process matches the header to the endpoint configuration according to a reduce function that matches the header to the OpenAPI document (step 520). Thereafter, the process continues to step 330 of FIG. 3.

Figure 6:
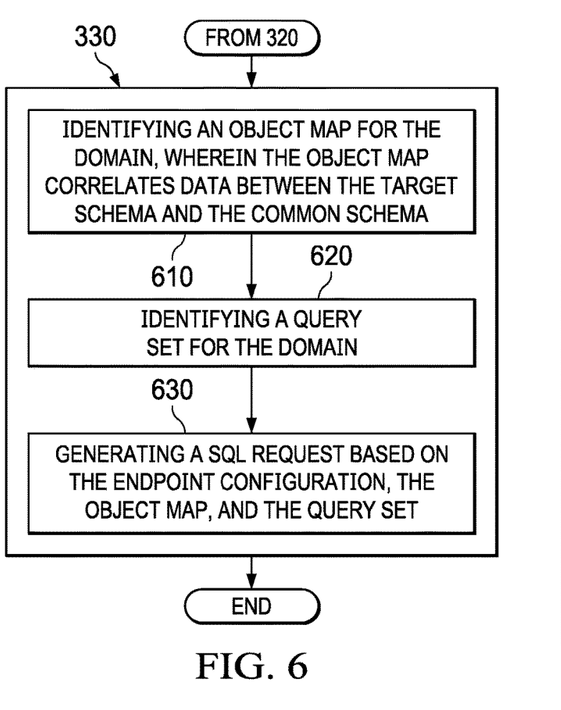
FIG. 6 is a flowchart of a process for decorating an endpoint configuration depicted in accordance with an illustrative embodiment.

With reference next to FIG. 6, a flowchart of a process for decorating an endpoint configuration is depicted in accordance with an illustrative embodiment. The process in FIG. 6 is an example one implementation for step 330 in FIG. 3.

Continuing from step 320, the process identifies an object map for the domain (step 610). The object map correlates data between the target schema and the common schema. The process identifies a query set for the domain (step 620). The process generates a SQL request based on the endpoint configuration, the object map, and the query set (step 630). Thereafter, the process continues to step 340 of FIG. 3.

Figure 7:
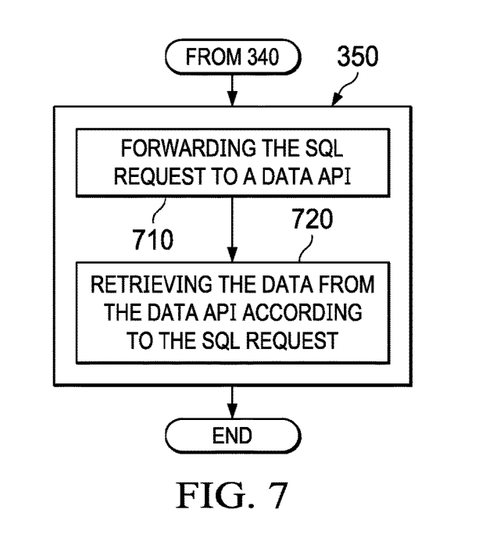
FIG. 7 is a flowchart of a process for retrieving data depicted in accordance with an illustrative embodiment.

With reference next to FIG. 7, a flowchart of a process for retrieving data is depicted in accordance with an illustrative embodiment. The process in FIG. 7 is an example one implementation for step 350 in FIG. 3 when performed in conjunction with the process of FIG. 3.

Continues from step 340 of FIG. 3, the process forwards the SQL request to a data API (step 710). The process retrieves the data from the data API according to the SQL request (step 720). Thereafter, the process terminates.

Figure 8:
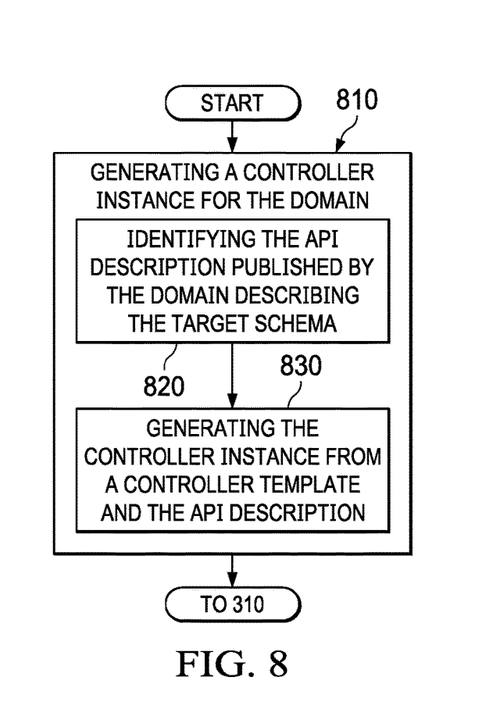
FIG. 8 is a flowchart of additional steps process for accessing data using a dynamic API controller depicted in accordance with an illustrative embodiment.

With reference next to FIG. 8, a flowchart of additional steps process for accessing data using a dynamic API controller is depicted in accordance with an illustrative embodiment. The process in FIG. 8 is an example one implementation for and additional processing steps that can be performed in conjunction with the process of FIG. 3.

The process generates a controller instance for the domain (step 810). In this illustrative example, generating the controller instance includes identifying the API description published by the domain describing the target schema (step 820). The API description is an OpenAPI document that specifies the data sets that are available in the domain and RESTful operations that can be called on the data sets. The process the controller instance from a controller template and the API description (step 830). Thereafter, the process continues to step 310 of FIG. 3.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
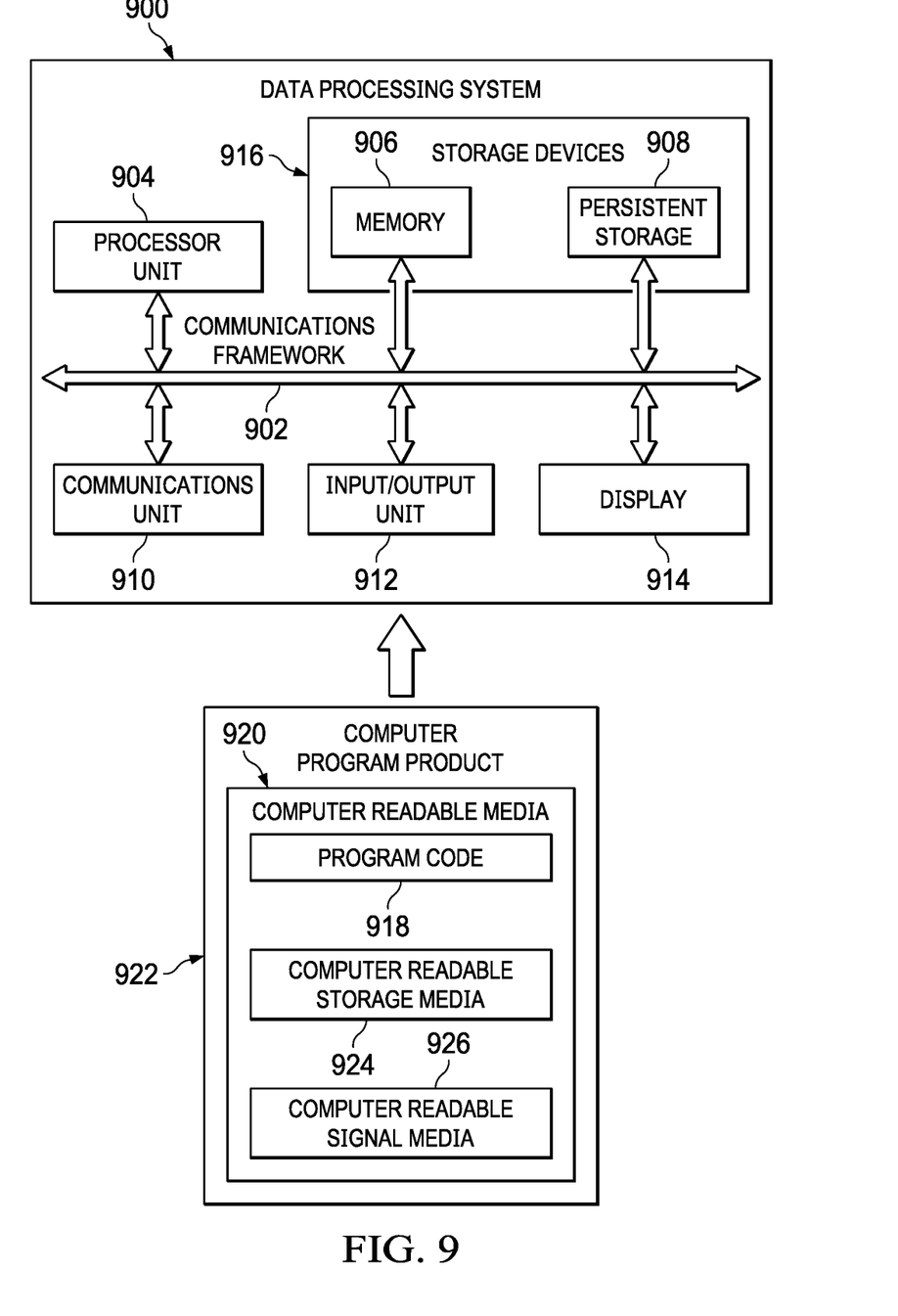
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are program instructions and are also referred are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 918 can be transferred to data processing system 900 using a computer-readable signal media. The computer-readable signal media are signals and can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for accessing data using a dynamic application programming interface ("API"), the method comprising:

receiving, by a computer system, from a requesting service, a request to access data contained in one or more data sets organized into a set of domains, wherein the request is received according to a target schema of the requesting service;

identifying, by the computer system, an endpoint configuration for a domain that provides access to the data that was requested, wherein the endpoint configuration is generated from an API description describing the target schema that is published by the domain;

decorating, by the computer system using an object map for the domain that correlates data between the target schema and a common schema, the endpoint configuration with additional information identified from metadata documents corresponding to the one or more data sets;

translating, by the computer system, the request into the common schema based on the endpoint configuration decorated with the additional information using the object map;

generating, by the computer system, based on the translated request, a SQL request in the common schema; and retrieving, by the computer system responsive to the SQL request, the data from the domain according to the common schema.

2. The method of claim 1, further comprising:
in response to retrieving the data, translating the data from the common schema to the target schema; and
sending a response to the requesting service, wherein the response includes the data that was translated into the target schema.

3. The method of claim 1, wherein identifying the endpoint configuration further comprises:
identifying a header in the request; and
matching the header to the endpoint configuration according to a reduce function that matches the header to an OpenAPI document.

4. The method of claim 1, wherein generating the SQL request comprises:
identifying a query set for the domain; and
generating the SQL request based on the endpoint configuration, the object map, and the query set.

5. The method of claim 4, wherein retrieving the data further comprises:
forwarding the SQL request to a data API; and
retrieving the data from the data API according to the SQL request.

6. The method of claim 1, further comprising:
generating a controller instance for the domain, including:
identifying the API description published by the domain describing the target schema; and
generating the controller instance from a controller template and the API description.

7. The method of claim 6, wherein the API description is an OpenAPI document that specifies the one or more data sets that are available in the domain and RESTful operations that can be called on the one or more data sets.

8. A computer system comprising:
one or more hardware processors; and memory storing program code, the program code when executed by the one or more hardware processors, instruct the one or more hardware processors to:
receive, from a requesting service, a request to access data contained in one or more data sets organized into a set of domains, wherein the request is received according to a target schema of the requesting service;
identify an endpoint configuration for a domain that provides access to the data that was requested, wherein the endpoint configuration is generated from an API description describing the target schema that is published by the domain;
decorate, using an object map for the domain that correlates data between the target schema and a common schema, the endpoint configuration with additional information identified from metadata documents corresponding to the one or more data sets;
translate the request into the common schema based on the endpoint configuration decorated with the additional information using the object map;
generate, based on the translated request, a computer instruction comprising a request in the common schema; and
retrieve, responsive to the computer instruction, the data from the domain according to the common schema.

9. The computer system of claim 8, wherein the one or more hardware processors are configured to:
in response to retrieving the data, translate the data from the common schema to the target schema; and
send a response to the requesting service, wherein the response includes the data that was translated into the target schema.

10. The computer system of claim 8, wherein to identify the endpoint configuration, the one or more hardware processors are configured to:
identify a header in the request; and
match the header to the endpoint configuration according to a reduce function that matches the header to an OpenAPI document.

11. The computer system of claim 8, wherein to generate the computer instructions, the one or more hardware processors are configured to:
identify a query set for the domain; and
a generate a SQL request based on the endpoint configuration, the object map, and the query set.

12. The computer system of claim 11, wherein to retrieve the data, the one or more hardware processors are configured to:
forward the SQL request to a data API; and
retrieve the data from the data API according to the SQL request.

13. The computer system of claim 8, wherein the one or more hardware processors are configured to:
generate a controller instance for the domain, including to:
identify the API description published by the domain describing the target schema; and
generate the controller instance from a controller template and the API description.

14. The computer system of claim 8, wherein the API description is an OpenAPI document that specifies the one or more data sets that are available in the domain and RESTful operations that can be called on the one or more data sets.

15. A computer program product comprising:
a computer readable storage media; and
program code, stored on the computer readable storage media, for accessing data using a dynamic application programming interface ("API"), the program code when executed, instruct a computer system to perform a method of:
receiving, from a requesting service, a request to access data contained in one or more data sets organized into a set of domains, wherein the request is received according to a target schema of the requesting service;
identifying an endpoint configuration for a domain that provides access to the data that was requested, wherein the endpoint configuration is generated from an API description describing the target schema that is published by the domain;
decorating, using an object map for the domain that correlates data between the target schema and a common schema, the endpoint configuration with additional information identified from metadata documents corresponding to the one or more data sets;
translating the request into the common schema based on the endpoint configuration decorated with the additional information using the object map;
generating, based on the translated request, a SQL request in the common schema; and
retrieving, responsive to the SQL request, the data from the domain according to the common schema.

16. The computer program product of claim 15, further comprising:
in response to retrieving the data, translating the data from the common schema to the target schema; and sending a response to the requesting service, wherein the response includes the data that was translated into the target schema.

17. The computer program product of claim 15, wherein identifying the endpoint configuration further comprises:
identifying a header in the request; and
matching the header to the endpoint configuration according to a reduce function that matches the header to an OpenAPI document.

18. The computer program product of claim 15, wherein generating the SQL request comprises:
identifying a query set for the domain; and
generating the SQL request based on the endpoint configuration, the object map, and the query set.

19. The computer program product of claim 18, wherein retrieving the data further comprises:
forwarding the SQL request to a data API; and
retrieving the data from the data API according to the SQL request.

20. The computer program product of claim 15, further comprising:
generating a controller instance for the domain, including:
identifying the API description published by the domain describing the target schema; and
generating the controller instance from a controller template and the API description.

21. The computer program product of claim 20, wherein the API description is an OpenAPI document that specifies the one or more data sets that are available in the domain and RESTful operations that can be called on the one or more data sets.

* * * * *